United States Patent
Sazhin et al.

(10) Patent No.: US 11,204,762 B2
(45) Date of Patent: Dec. 21, 2021

(54) SYSTEMS AND METHODS FOR TRACKING FEATURES IN A DEVELOPMENT ENVIRONMENT

(71) Applicant: UST Global Inc., Aliso Viejo, CA (US)

(72) Inventors: Evgeny Sazhin, Aliso Viejo, CA (US); Ming Gong, Aliso Viejo, CA (US)

(73) Assignee: UST Global Inc, Aliso Viejo, CA (US)

( * ) Notice: Subject to any disclaimer, the term of this patent is extended or adjusted under 35 U.S.C. 154(b) by 49 days.

(21) Appl. No.: 16/828,215

(22) Filed: Mar. 24, 2020

(65) Prior Publication Data

US 2021/0303298 A1    Sep. 30, 2021

(51) Int. Cl.
*G06F 8/77*     (2018.01)
*G06F 9/54*     (2006.01)

(52) U.S. Cl.
CPC . *G06F 8/77* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 2006/0235736 A1* | 10/2006 | Guckenheimer | ....... | G06F 9/453 715/708 |
| 2009/0169008 A1 | 7/2009 | Gonzales | | |
| 2010/0324964 A1 | 12/2010 | Callanan | | |
| 2013/0104046 A1* | 4/2013 | Casco-Arias Sanchez | ................. | H04L 63/20 715/736 |
| 2014/0130134 A1* | 5/2014 | Arora | ...................... | G06F 21/00 726/4 |
| 2014/0317203 A1 | 10/2014 | Voeller | | |
| 2015/0058228 A1 | 2/2015 | Voeller | | |
| 2015/0160931 A1* | 6/2015 | Glazer | .................. | G06F 3/0484 717/109 |
| 2016/0283222 A1* | 9/2016 | Yaros | ........................ | G06F 8/38 |
| 2018/0173390 A1* | 6/2018 | Dunne | .................... | G06F 9/547 |
| 2018/0307580 A1 | 10/2018 | Potts | | |
| 2020/0267111 A1* | 8/2020 | Chen | ........................ | H04L 51/36 |

FOREIGN PATENT DOCUMENTS

CN        110222091 A        9/2019

OTHER PUBLICATIONS

International Search Report and Written Opinion of International Searching Authority for Application No. PCT/US2021/023989, dated Jun. 29, 2021 (12 pages).

* cited by examiner

*Primary Examiner* — Philip Wang
(74) *Attorney, Agent, or Firm* — Nixon Peabody LLP

(57) ABSTRACT

A system for tracking features of one or more applications is provided. The system is configured to: monitor the one or more applications, generating log data associated with the one or more applications and tracking progress data associated with features of the one or more applications; determine, from a scope of interest data, a set of applications from the one or more applications; determine, from the scope of interest data, roles for each application in the set of applications; extract user log data and/or user progress data associated with the set of applications based on the roles for each application in the set of applications; and provide, to a client device, the user progress data associated with the set of applications and the user log data associated with the set of applications for displaying on the client device.

11 Claims, 12 Drawing Sheets

SYSTEMS AND METHODS FOR TRACKING FEATURES IN A DEVELOPMENT ENVIRONMENT

TECHNICAL FIELD

The present disclosure relates to tracking features in one or more projects and more specifically to systems and methods that display status and information concerning features of one or more applications in a software development environment.

BACKGROUND

DevOps practice combines software development and information technology operations for providing continuous delivery of software updates with high quality. DevOps can shorten software systems development cycle, allowing new software features, new software products, and/or software updates to be incorporated in the software systems. DevOps practice is accomplished with multiple tools. These can include tools for coding software being added to a software system, building the software system after adding new code, testing the built software system, monitoring performance of the software system, etc. In the software system, a small change made in one part of the source code can affect other parts of the code, hence there exists a wide-ranging list of tools used in determining how the software system performs once changes are made.

Other approaches to development and project management also exist. For example, agile software development, ArchOps, continuous delivery, DataOps, etc., can be used to improve or maintain a software system. Software companies or organizations have teams that can work on different parts of the software system simultaneously. The tools used in maintaining and updating the software system can generate numerous data log files or numerous files in general. Information contained within these files can end up being siloed to one individual or one team if continual communication is not part of the development process. Information being siloed can disrupt timing and can introduce complexities in cross-team cooperation, thereby potentially delaying a release of the software system. The present disclosure provides systems and methods that address drawbacks associated with managing large datasets and prevents adverse effects of information silos.

SUMMARY

According to some implementations of the present disclosure, a system for tracking features of one or more applications in a software development environment is provided. The system includes a non-transitory computer-readable medium storing computer-executable instructions thereon such that when the instructions are executed, the system is configured to: (a) monitor the one or more applications, generating records associated with the one or more applications and tracking progress data associated with features of the one or more applications; (b) determine, from a scope of interest data, a set of applications from the one or more applications, the set of applications being associated with a user; (c) determine, from the scope of interest data, roles for each application in the set of applications, wherein the roles are described in relation to the user; (d) extract, from the log data, user log data associated with the set of applications based on the roles for each application in the set of applications; (e) extract, from the progress data, user progress data associated with the set of applications based on the roles for each application in the set of applications; and (f) provide, to a client device via an application programming interface (API), the user progress data associated with the set of applications and the user log data associated with the set of applications for displaying on the client device.

According to some implementations of the present disclosure, a method for tracking features of one or more applications in a software development environment is provided. Some steps of the method includes: (a) monitoring the one or more applications to generate records associated with the one or more applications and progress data associated with features of the one or more applications; (b) determining, from a scope of interest data, a set of applications from the one or more applications, the set of applications being associated with a user; (c) determining, from the scope of interest data, roles for each application in the set of applications, wherein the roles are described in relation to the user; (d) extracting, from the log data, user log data associated with the set of applications based on the roles for each application in the set of applications; (e) extracting, from the progress data, user progress data associated with the set of applications based on the roles for each application in the set of applications; and (f) providing, to a client device via an application programming interface (API), the user progress data associated with the set of applications and the user log data associated with the set of applications for displaying on the client device.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
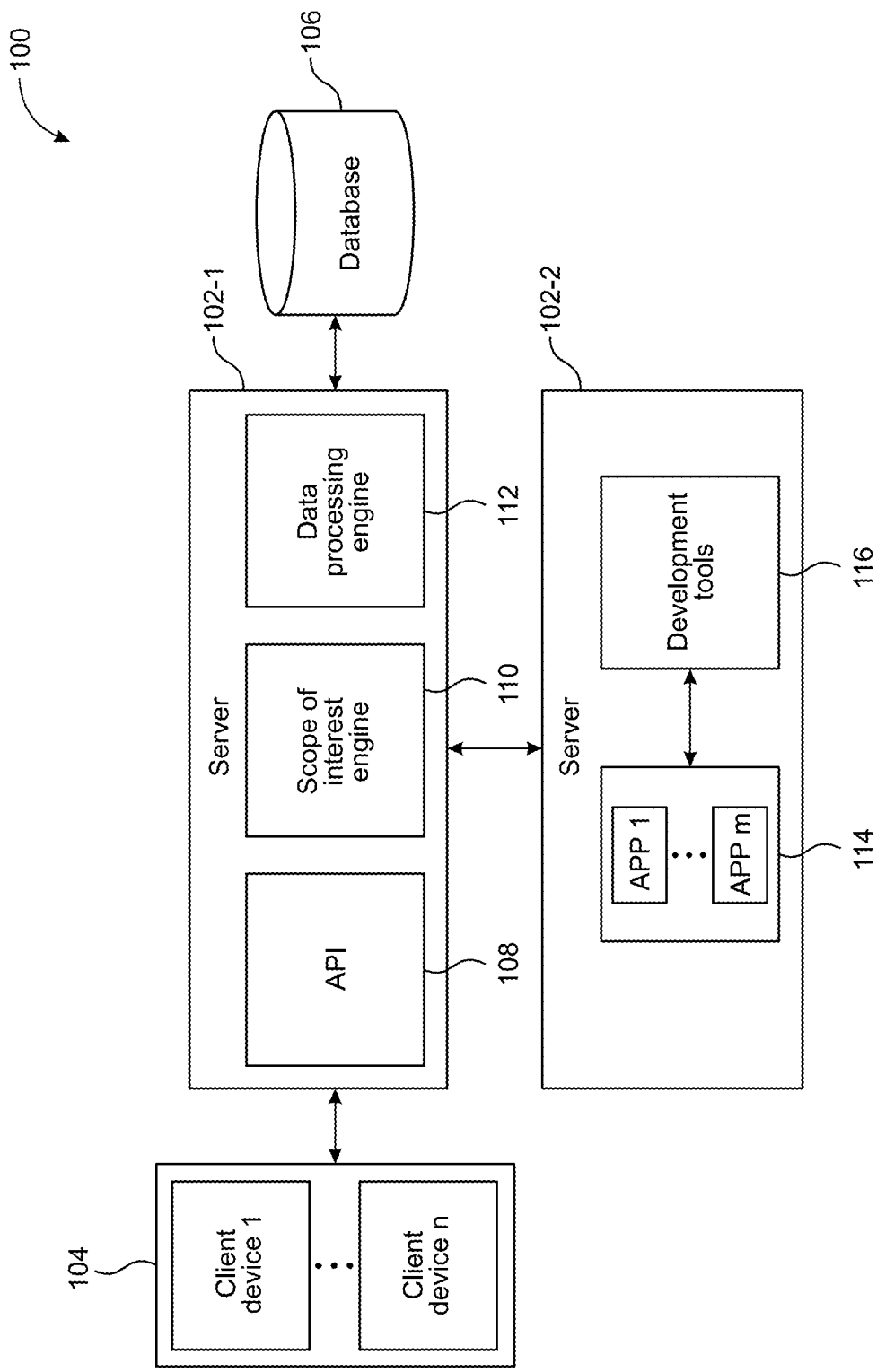
FIG. 1 illustrates a block diagram of a system for tracking and displaying features of one or more applications according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Management teams, including software development teams, utilize management tools to coordinate activities between team members. In some cases, a team manager or product manager can answer to an individual higher up in a corporate hierarchy. The corporate hierarchy or organization structure may or may not reflect working relationships between different teams or different team members. For example, the organization structure can show that Person A has a manager title and is a management level employee and that Person B is not a management level employee and reports to Person C. In actual working relationships, Person A and Person B can be on a same team where Person B is a project manager for the project being worked on by that team. Person A may have been recruited on a provisional basis by the team due to expertise that Person A possesses that other team members do not have. In the preceding example, the organizational structure does not necessarily match working relationships within the organization.

Organizations are concerned not just with capturing working relationships but also making sure that appropriate information is communicated between individuals in the organization. For example, if Person A who is management level feels it unnecessary to discuss her work in detail with Person B who is not management level, then Person B's effectiveness as a project manager can suffer. Furthermore, Person B may not have direct access to Person A's files or work product, hence may not be able to view information she may require. Even if Person B had direct access to Person A's files, information that Person B may be interested in may be hidden in a flood of non-pertinent files.

Embodiments of the present disclosure provide a system and method for displaying status and information concerning features of one or more applications. For ease of description, a software development environment will be used as an example, but embodiments of the disclosure can be applied in other scenarios involving information management. In software development, an organization may have, for example, over thirty DevOps tools, with each tool being utilized in maintaining a software system. Each tool can generate data and telemetry associated with the software system, various applications within the software system, various features within the software system, or any combination thereof. Embodiments of the disclosure determine which data to provide to a user or which data to provide for displaying on a user's device based on an identity of the user and one or more roles that the user plays.

Embodiments of the present disclosure provide a system and method for users to track journey of a feature from beginning of a development process until end of production. By allowing users to view appropriate information without being inundated with non-pertinent data generated by the multitude DevOps tools, a respective user is able to better track features through a development process across multiple tools. Embodiments of the present disclosure are geared to facilitate machine learning based approaches to organize storage and retrieval operations, thereby speeding up data retrieval by the respective user based on the user's scope of interest.

Embodiments of the present disclosure provide a dynamic and flexible way of organizing data in a computing system of an organization for efficient data retrieval. If an organization has a team of people developing an application, there are different ways the different people can be linked or related to the project of developing the application. Embodiments of the present disclosure provide systems and methods for classifying the different ways that the different people can be linked or related to the project. Some people may be working on the project directly as contributors, some may only have an ownership interest or a management interest, and some some may just interested be interested in the status of the project as peers or may be interested due the project's influence on parallel projects. Embodiments of the present disclosure can use a person's involvement as a basis for data retrieval and which set of data to show to the person. As an individual's interest changes (or as the individual's scope of interest changes), the data retrieved and shown to the person can also change dynamically. In the context of DevOps, best practices of DevOps can be followed by some embodiments of the present disclosure. Best practices include transparency, collaboration, awareness of allowing anyone to view any item in a project, comparing data for different entities, and making conclusions more objectively based on available data.

FIG. 1 illustrates a block diagram of a system 100 for displaying status and information concerning features of one or more applications according to some implementations of the present disclosure. To simplify discussion, the singular form will be used for components identified in FIG. 1 when appropriate, but the use of the singular does not limit the discussion to only one of each such component. The system 100 includes a server 102, one or more client devices 104, and a database 106. The server 102 is shown in FIG. 1 as a server 102-1 and a server 102-2 to indicate in that some embodiments, the server 102 can be a distributed server with physical components at different physical locations.

The one or more client devices 104 are depicted as client device 1, ... client device n. The one or more client devices 104 can include a desktop computer, a laptop computer, a smart phone, a smart television, a smart watch, etc. The one or more client devices 104 interface with the server 102 to configure settings and preferences for displaying data on the one or more client devices 104. The one or more client devices 104 receive tailored data from the server 102. Each of the one or more client devices 104 includes one or more processors and a non-transitory computer readable medium with instructions stored thereon. The non-transitory computer readable medium can include volatile memory, non-volatile memory, hard drives, random access memories, read only memories, flash drives, etc. The one or more client devices 104 can include one or more network interfaces for communicating with the server 102. An example network interface includes wired network interfaces like Ethernet and wireless network interfaces like Bluetooth radio, Wi-Fi radio, etc.

The server 102 is configured to receive settings, instructions, and/or preferences from the one or more client devices 104. The server 102 is configured to use these settings from the client devices 104 to tailor data for display on the one or more client devices 104. The server 102 may be one computer or a network computers or servers. The server 102 includes one or more processors and a non-transitory computer readable medium with instructions stored thereon. The server 102 can include one or more network interfaces, hard drives, etc. The server 102 can include an application programming interface (API) 108. The API includes instructions for sending, receiving, and translating requests and data between the server 102 and the one or more client devices 104.

The server 102 can include a scope of interest engine 110. An engine is a combination of hardware and software configured to perform specific functionality. The scope of interest engine 110 stores settings from the client devices 104 as scope of interest data. In some embodiments, scope of interest data is arranged in a hierarchical structure where the one or more client devices 104 can arrange the hierarchy or instruct the server 102 via the scope of interest engine 110 to arrange the hierarchy in a customized manner. The scope of interest data can link multiple project files together based on an arrangement by the one or more client devices 104.

The server 102 can include a data processing engine 112 for gathering data from the database 106, development tools 116, one or more applications 114, one or more services running on the server 102, or any combination thereof. The data processing engine 112 can further transform the gathered data into one or more formats digestible by the server 102 for reporting to the one or more client devices 104 via the API 108. That is, the data processing engine 112 can include one or more daemon programs that generate records associated with the one or more applications 114, the development tools 116, and/or the database 106. The records, that is, the transformed gathered data in the one or more digestible formats, can be stored in the database 106. In some implementations, the records can include transformed event logs, error logs, internet information services (IIS) logs, Apache logs, web server logs, application logs, etc. The data processing engine 112 can generate records associated with runtime operation of the one or more applications 114, information requests from the one or more applications 114, interactions between the one or more applications 114 and other devices or systems, for example, the one or more client devices 104.

The data processing engine 112 can also generate progress data associated with changes to an application or service running on the server 102. For example, the data processing engine 112 can interface with one or more project management tools via one or more APIs. The project management tools can be included in the development tools 116. The project management tools can include one or more tasks and/or scheduled or projected completion dates for the one or more tasks. The project management tools can receive input from the one or more client devices 104 on whether a certain task is completed. The data processing engine 112 can receive task completion data and progress data associated with the tasks from the project management tools. In some embodiments, during software development for a software system, features and bugs are tracked. As features are incorporated into the software system the data processing engine 112 can track progress data associated with the features. Similarly, as bugs are being fixed, the data processing engine 112 can track progress data associated with the bug fixes.

The data processing engine 112 can gather data on a prescribed or predetermined schedule. The data processing engine 112 can generate the reports on a prescribed or predetermined schedule. For example, a publisher/subscriber model can be used for generating reports by the data processing engine 112. In a messaging system, a publisher/subscriber model is a form of asynchronous service-to-service communication used in serverless and microservices architecture. In a publisher/subscriber model, any message published to a topic is immediately received by all subscribers to that topic. In some implementations, the data processing engine 112 can subscribe to a topic (e.g., a Kafka Topic) such that when data associated with the subscribed-to topic is gathered, the data processing engine 112 transforms the gathered data associated with the subscribed-to topic into a record. As such, only gathered data associated with subscribed-to topics are transformed into records. The data processing engine 112 can thus prioritize data transformation and can organize generated records by topics.

The server 102 can include the development tools 116 that enable software development engineers to edit, build, and deploy application source codes in the server 102. The development tools 116 can include DevOps tools which can generate data at multiple levels of software development. For example, the development tools 116 can generate data associated with when source code was last changed, a user that last changed the source code, errors generated when the source code was compiled, errors generated while running and testing the software system, etc. Multiple users on a team can modify different sections of the source code, can identify bugs that should be fixed, etc. The development tools 116 provide additional information on software development process for at least one of the one or more applications 114. In some implementations, the development tools 116 probe the one or more applications 114 to provide data for record generation by the data processing engine 112.

In some embodiments, the server 102 can store project files or project entities as JavaScript Object Notation (JSON) files. The JSON files can describe the linking/association between a project, the development tools 116 and various data elements from the development tools 116. For example, the JSON files can describe where source code repositories used by the project are located, which jobs are continuous integration jobs, which teams or users are working on the project, which management tools (e.g., Jira) are used for issue tracking, and so on. A JSON project file for an application, e.g., App 1, can include development tools, source code repositories for App 1, log file repositories for App 1, team members working on App 1, etc. The data processing engine 112 can use the project file to associate data collected with App 1.

Figure 1A:
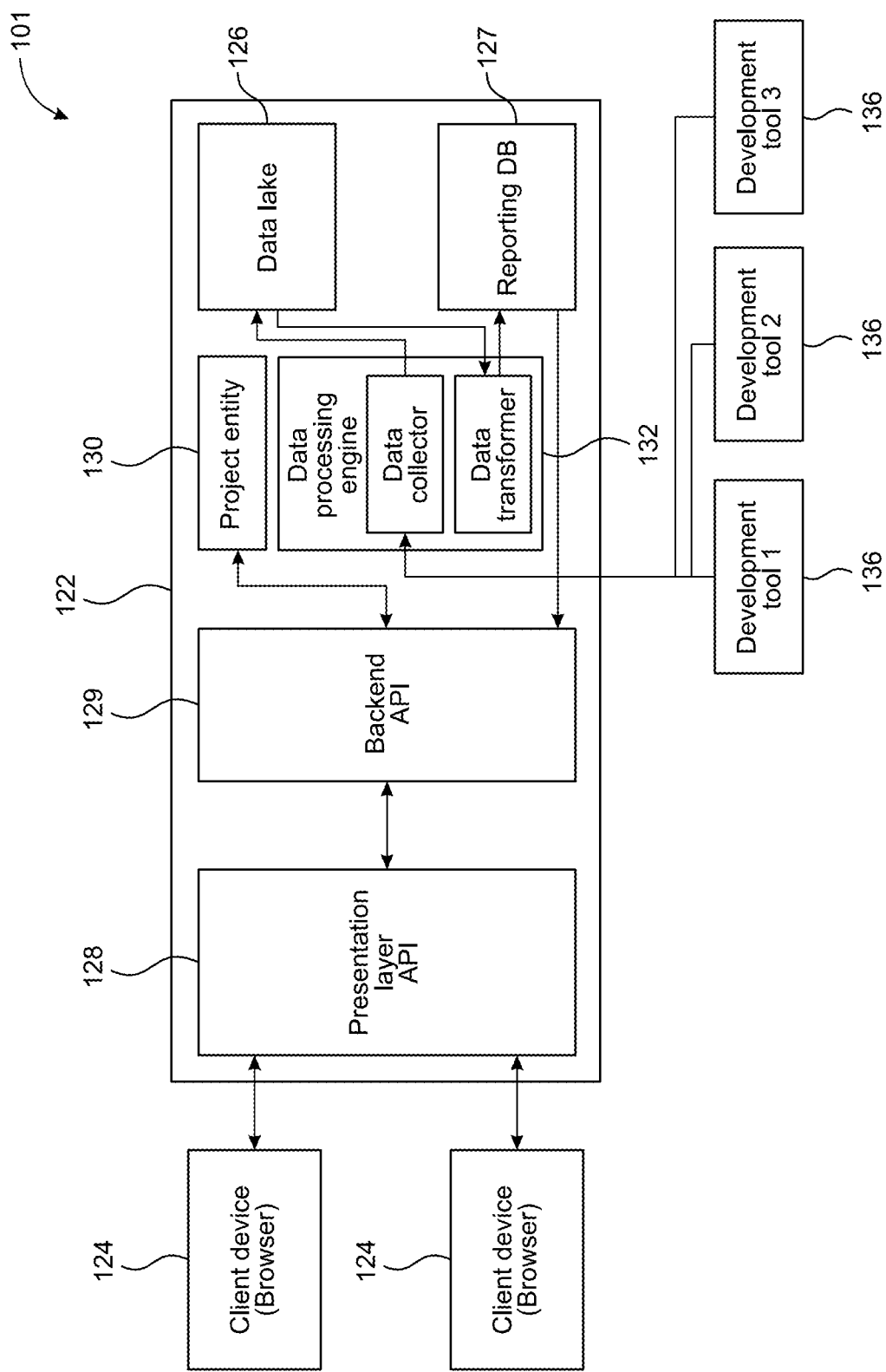
FIG. 1A illustrates a block diagram of an example system for tracking and displaying features of one or more applications according to some implementations of the present disclosure.

Referring to FIG. 1A, a block diagram for a system 101 for displaying status and information concerning features of one or more applications is provided, according to some implementations of the present disclosure. The system 101 includes one or more client devices 124. The client devices 124 are similar to or the same as the one or more client devices 104. The client devices 124 interact with a server 122. In the system 101, the server 122 gathers data from one or more development tools 136. The one or more development tools 136 are similar to or the same as the development tools 116.

The server 122 includes a data lake 126, a reporting database 127, a presentation layer API 128, a backend API 129, a project entity 130, and a data processing engine 132. The data processing engine 132 is similar to or the same as the data processing engine 112. The data processing engine 132 includes at least two elements: a data collector and a data transformer. The data collector and the data transformer of the data processing engine 132 are a combination of hardware and software for realizing functionality attributed to each of these two elements.

The data collector of the data processing engine 132 is configured to gather data from the one or more development tools 136. The data collector is further configured to store gathered data in the data lake 126. The data transformer of the data processing engine 132 is configured to transform data stored in the data lake 126 into records in one or more formats digestible by the server 122, the reporting database 127, etc. In some implementations, the data collector and the data transformer can use a publisher/subscriber model for data processing. That is, the data transformer can subscribe to one or more topics (e.g., Kafka Topics), and when the data collector gathers data from the one or more development tools 136 related to the one or more subscribed-to topics, the data transformer can then begin processing the gathered data. That is, the data collector can "publish" that newly gathered data pertaining to a certain topic is available, and the data transformer subscribed to the topic can begin processing data from the data lake 126.

In some implementations, the presentation layer API 128 is a representational state transfer (REST) API that is responsible for providing the processed data for visual presentation. The presentation layer API 128 can provide JSON documents based on which user interface (UI) elements such as charts and graphs are built.

In some implementations, the backend API 129 is a service layer that allows for clients (e.g., the client devices 124) to communicate with databases in a controlled and simplified manner, without requiring every client to authenticate against each database and operate directly on the database level. An advantage to having the presentation layer API 128 and the backend API 129 is that critical changes can be performed on the databases without the need to rework multiple modules. Instead, the server 122 reworks the internal of the service layer while maintaining the service contracts (Service API) intact where possible.

For example, when a request comes from a user browser, the request first hits the presentation layer API 128. The presentation layer API 128 then asks the backend API 129 and the databases (e.g., the reporting database 127) for a particular dataset based on parameters included in the request. When the presentation layer API 128 receives the requested dataset, the presentation layer API 128 then transforms the requested dataset into a format that is digestible by the UI layer and returns the transformed dataset to the user browser. A charting library can then be used to build particular charts from the transformed dataset. As thus described, the request from the client device 124 can be processed by the presentation layer API 128, the backend API 129, the project entity 130, the reporting database 127 and then results can flow back to the backend API 129, the presentation layer API 128, and then to the client device 124. For example, results for a team oriented chart will require the backend API 129 to work with the project entity 130 and then find related data in the reporting DB 127 and return the dataset to the backend API 129, which then returns the dataset to the presentation layer 128 and then to the client device 124.

The project entity 130 is a construct including several tables and represents one project within the system. The project entity 130 allows linking various data points from different third party tools together, based on specified configuration and mappings. For example, the project entity has information about all individuals working with the project entity 130, such as all developers. Reporting database 127 can carry raw data about code commits by developers for all projects configured on the server 122. When a request for building a chart about commits for a particular project is received, the project entity 130 is probed to see which people and which repositories are associated with the specific project of the project entity 130. A query is then built for the reporting database 127 with parameters of the request used as filter parameters.

Figure 2:
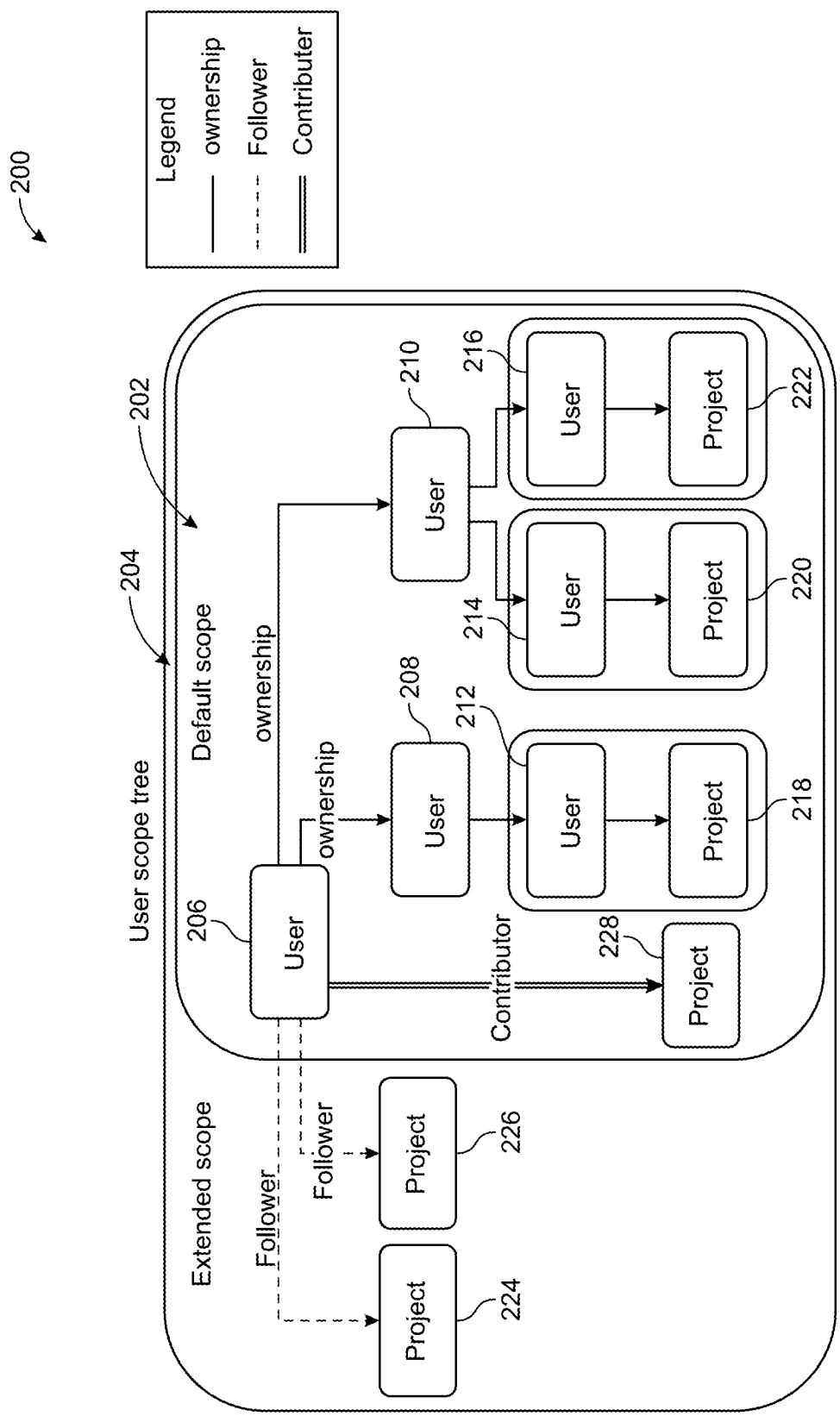
FIG. 2 illustrates a scope of interest tree according to some implementations of the present disclosure.

Referring to FIG. 2, a scope of interest tree 200 is illustrated according to some implementations of the present disclosure. The scope of interest tree 200 is an example of how scope of interest data can be organized. A root node or parent node of the scope of interest tree 200 is a user entity 206. The user entity 206 (or in short form, the user 206) is a user for which the scope of interest tree 200 belongs. The scope of interest tree 200 describes relationships or linkages between user entities and projects. In some implementations, every user can have one-to-many linkages with other users, and in some embodiments, one-to-many linkages are limited to managers in an organization.

Users can be of two types, owners or actors. Owners are part of the hard hierarchy of the scope of interest tree 200. Actors do not have ownership and are not involved in upstream hierarchy filtering. For example, the scope of interest tree 200 shows the user entity 206 has an ownership relationship with user entity 208 and user entity 210. The user entity 208 has an ownership relationship with user entity 212 which has an ownership relationship with project 218. The chain of ownership from the user entity 206 to the project 218 is illustrated in the hierarchy.

Actors on the other hand do not invoke such chain of ownership being illustrated in the scope of interest data. For example, the user entity 206 is shown to be a contributor to project 228, and the user entity 206 is shown to be a follower of project 224 and project 226. The project owners for the project 224, the project 226, and the project 228 are not included in the scope of interest tree 200. A follower relationship enables the user entity 206 to watch files related to the project 224 and the project 226. A contributor relationship enables the user entity 206 to work on a particular project, e.g., the project 228.

The scope of interest tree 200 can be treated in two different scopes, a default scope 202 and an extended scope 204. The default scope 202 includes ownership and contributor relationships. The extended scope 204 includes all types of relationships including follower relationships. The project entities shown in the scope of interest tree 200 can be JSON project files as described above in connection with FIG. 1. Each project entity has an owner even if not displayed within a user's scope tree. A project entity can be associated with one application, e.g., only App 1 in FIG. 1. A project entity can also have several repositories and multiple continuous integration jobs.

Figure 3:
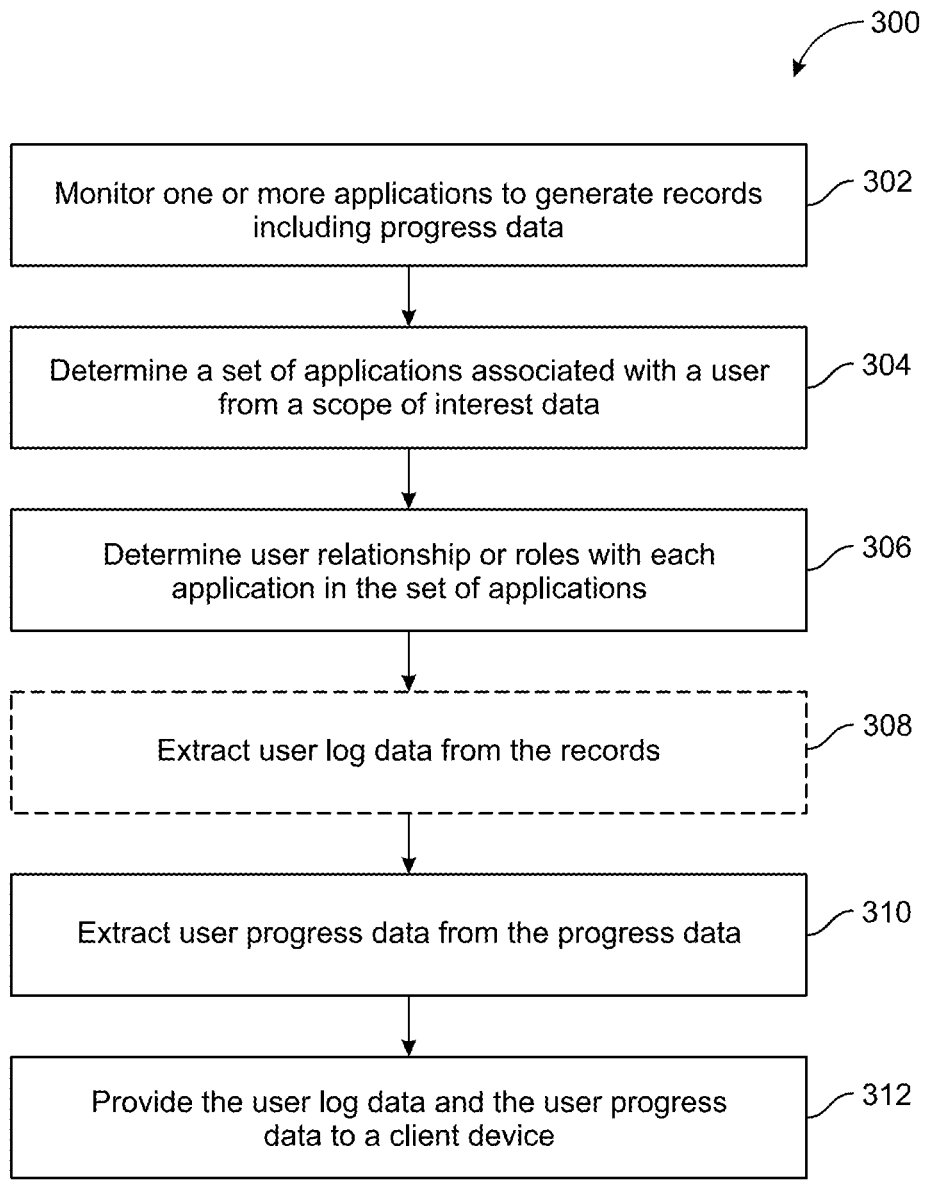
FIG. 3 is a flow diagram for tailoring how to display features of one or more applications according to some implementations of the present disclosure.

Referring to FIG. 3, a flow diagram showing a process 300 for tailoring how to display data relating to features of one or more applications is provided according to some implementations of the present disclosure. At step 302, the server 102 (via the data processing engine 112) monitors one or more applications, development tools, etc., by gathering data as described in relation to FIGS. 1 and 1A to generate records. The generated records can include transformed event logs, progress data, etc., and can be stored in the database 106. The records associated with the one or more applications, development tools, etc., can be stored based on settings provided in a JSON project file.

At step 304, the server 102 (via the scope of interest engine 110) determines a set of applications associated with a user from scope of interest data. The scope of interest data can include projects or applications that the user is following, that the user is contributing to, that the user is an owner of, or any combination thereof. The server 102 extracts, from the scope of interest, data which can be organized hierarchically as depicted in FIG. 2.

At step 306, the server 102 (via the scope of interest engine 110) determines roles that the user plays for each application in the set of applications. That is, the server 102 determines user relationship with each application in the set of applications. The user can be a follower of an application, an owner of an application, or a contributor to an application. Each of these roles can demand a different type of information being provided to the user, therefore, the server 102 tracks each role.

Optionally, at step 308, the server 102 (via the scope of interest engine 110) extracts user log data from the log data. The log data generated at step 302 can include log information from applications that the user is not following, is not an owner of, or is not contributing to. As such, the server 102 identifies log data that is of interest to the user based on the roles for each application in the set of applications. The log data that is of interest to the user is the user log data.

At step 310, the server 102 (via the scope of interest engine 110) can similarly extract user progress data from the progress data generated at step 302. The user progress data includes issue tracking information, feature tracking information, bug tracking information, etc., that is of interest to the user based on the roles identified in the scope of interest data.

At step 312, the server 102 provides the user log data and the user progress data to a client device, e.g., the one or more client devices 104. FIG. 3 provided steps in relation to the server 102 while FIG. 4 provides steps in relation to the one or more client devices 104.

Figure 4:
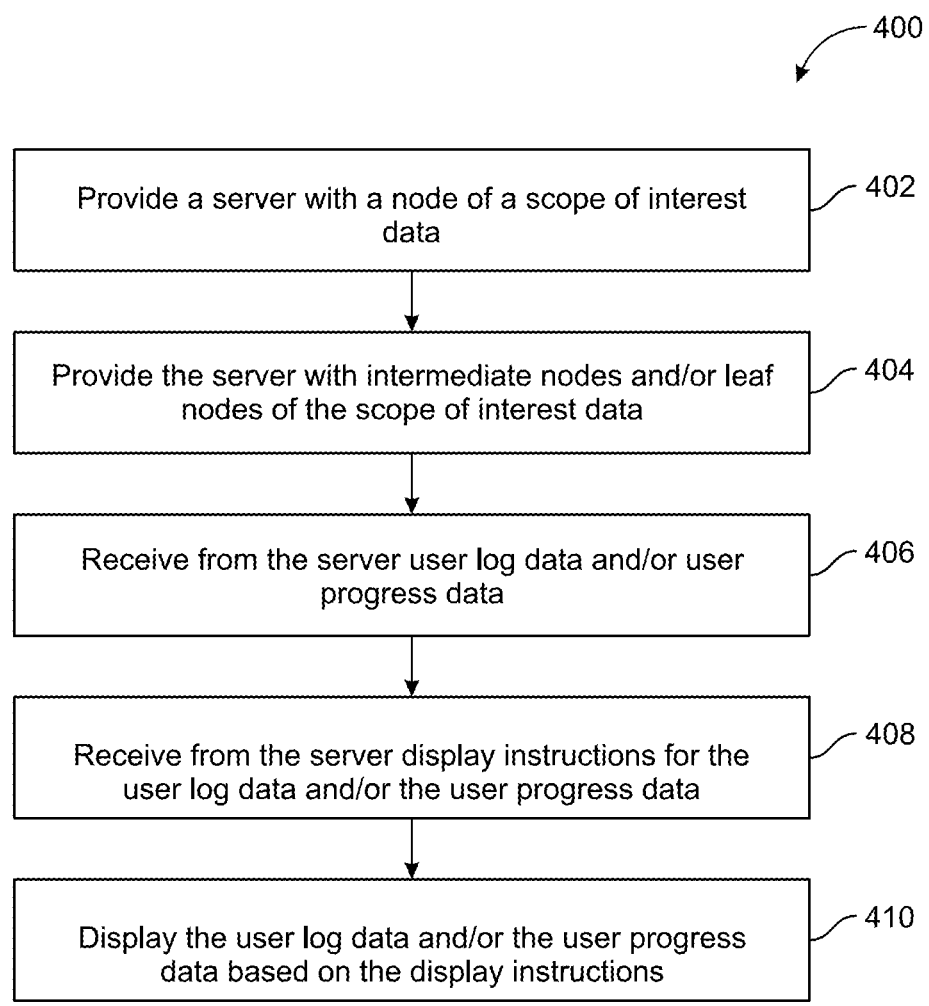
FIG. 4 is a flow diagram for using scope of interest data to request data pertaining features of one or more applications, according to some implementations of the present disclosure.

Referring to FIG. 4, a flow diagram showing a process 400 for using scope of interest data to receive data relating to features of one or more applications is provided according to some implementations of the present disclosure. At step 402, a client device, e.g., the one or more client devices 104, provides the server 102 with a parent node of a scope of interest data. The parent node of the scope of interest data is a user entity that identifies the user. Referring to FIG. 2, the user entity 206 is a parent node of the scope of interest tree 200.

At step 404, the one or more client devices 104 provide the server with intermediate nodes and/or leaf nodes of the scope of interest data. Intermediate nodes exist in response to hierarchical ownership as depicted in FIG. 2 with the user entity 208, the user entity 210, the user entity 212, the user entity 214, and the user entity 216 being intermediate nodes. In some embodiments, the one or more client devices 104 merely designate a user entity and the server 102 (via the scope of interest engine 110) populates other intermediate nodes and leaf nodes. For example, referring to FIG. 2, the one or more client devices 104 designate the user entity 208 as an intermediate node (an ownership relationship). The scope of interest engine 110 can then populate the user entity 212 as another intermediate node (based on the ownership relationship between the user entity 208 and the user entity 212). Furthermore, the project 218 leaf node can be auto populated as well based on the ownership relationship between the user entity 212 and the project 218. Apart from the intermediate nodes, the one or more client devices 104 can also provide leaf nodes attached to the parent node. Examples of these are shown in FIG. 2 where follower and contributor relationships directly link the parent node to projects (i.e., the project 228, the project 224, and the project 226).

Step 404 can include a series of instructions that the one or more client devices 104 provides to the server 102. The one or more client devices 104 can send instructions that include (i) an instruction to add a first user to the scope of interest data, the first user being related to the user in an ownership relationship; (ii) an instruction to remove a second user from the scope of interest data; (iii) an instruction to add a first application to the scope of interest data, the first application being an application in the set of applications, and the first application being related to the user in an ownership relationship; (iv) an instruction to add a second application to the scope of interest data, the second application being an application in the set of applications, and the second application being related to the user in a following relationship; (v) an instruction to add a third application to the scope of interest data, the third application being an application in the set of applications, and the third application being related to the user in a contributing relationship; (vi) an instruction to remove a fourth application from the scope of interest data; or (vii) any combination thereof. The one or more client devices 104 can go through a wizard application to create project entities or select project teams to add to the scope of interest tree.

At step 406, the one or more client devices 104 receive from the server 102 user log data and/or user progress data. The log data and/or the user progress data can be data identified in records stored in the database 106.

At step 408, the one or more client devices receives from the server 102 display instructions for the user log data and/or the user progress data. The display instructions direct the one or more client devices 104 how to display the user log data and/or the user progress data.

Figure 5A:
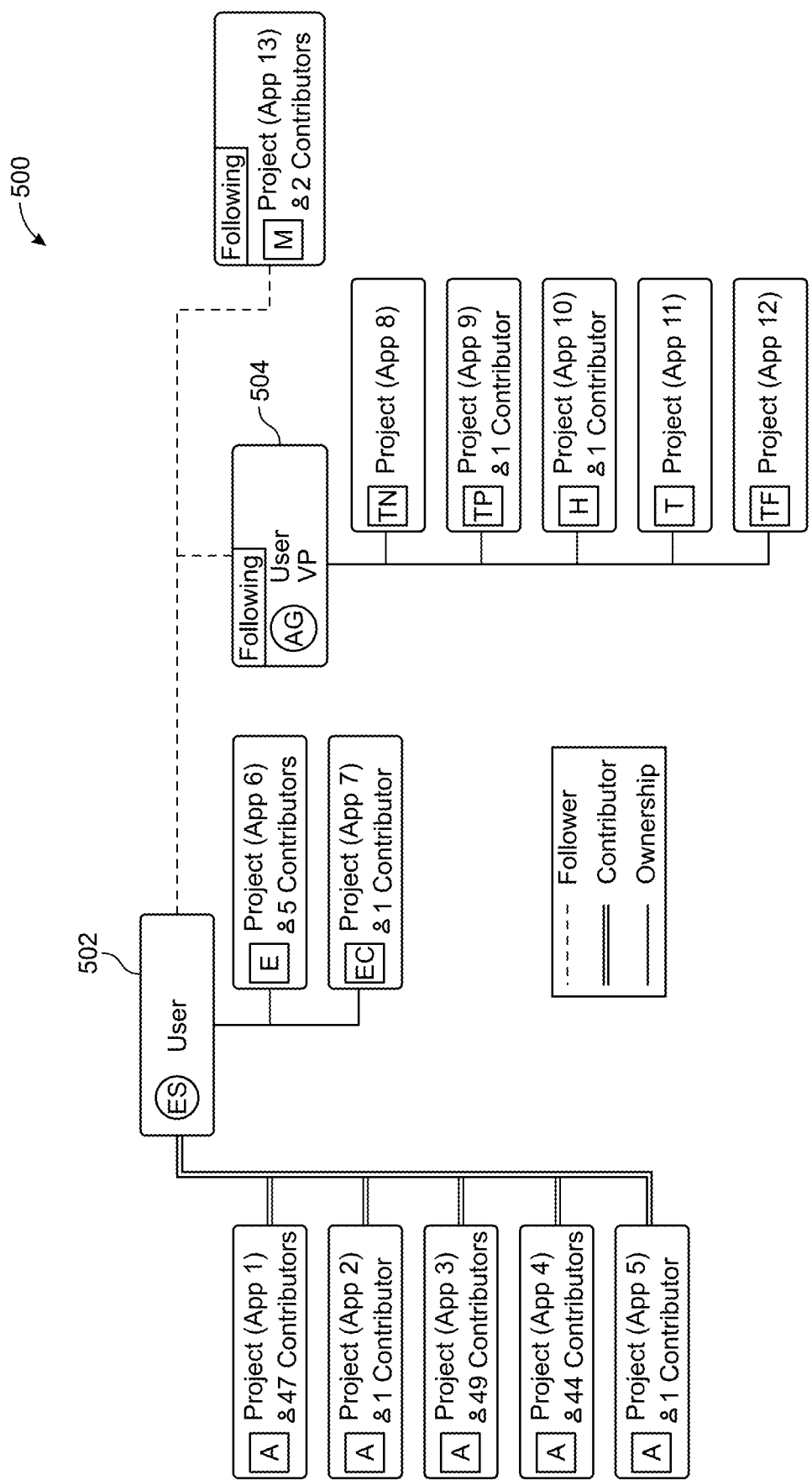
FIGS. 5A and 5B are example scope of interest trees according to some implementations of the present disclosure.
Figure 5B:
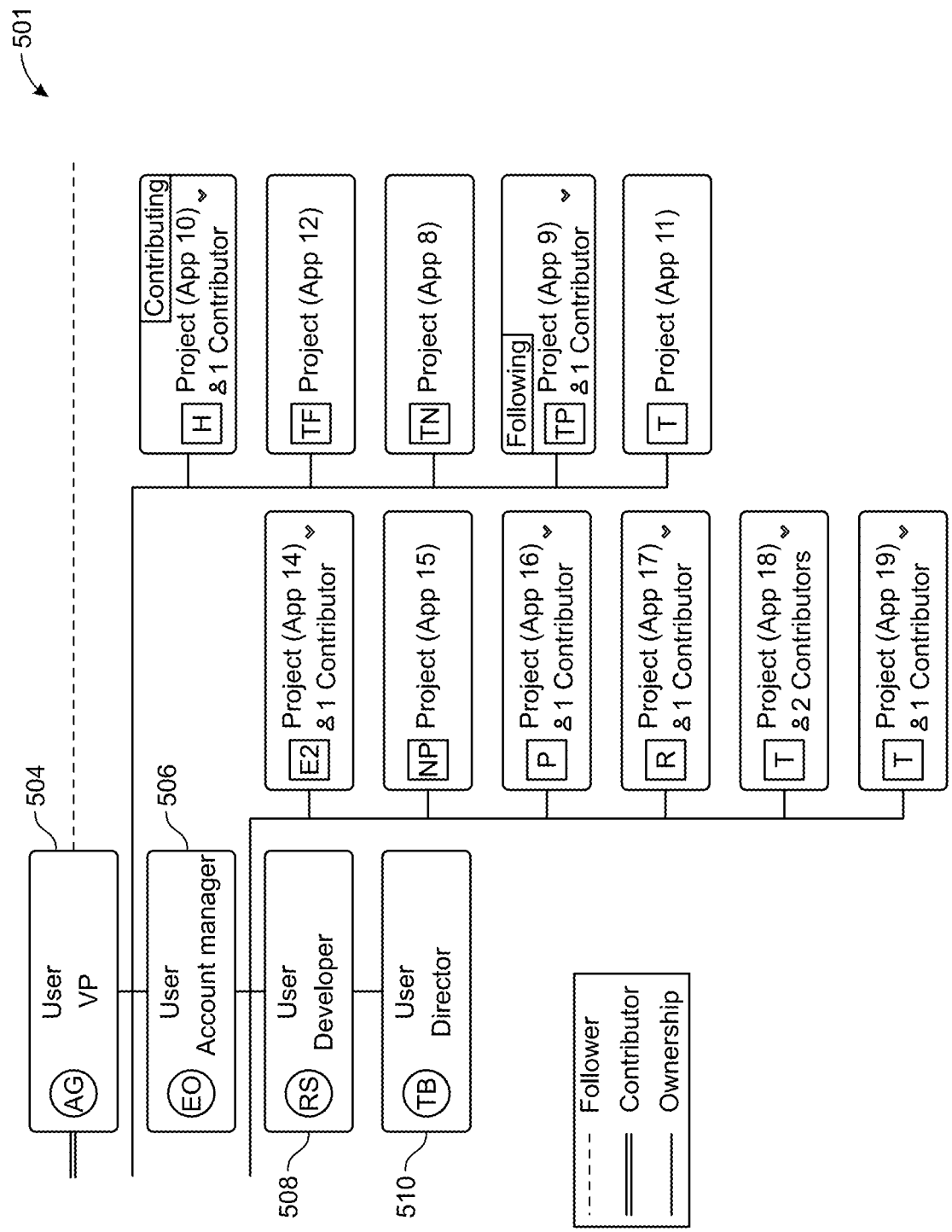

At step 410, the one or more client devices display the user log data and/or the user progress data based on the display instructions. The display instructions can include, for example, portfolio level viewing, application level viewing, and team level viewing. FIGS. 5A and 5B are used as examples to illustrate displaying according to display instructions.

FIG. 5A illustrates an example scope of interest tree 500 for a user 502 according to some implementations of the present disclosure. The user 502 is shown to contribute to five projects, that is, projects for App 1, App 2, App 3, App 4, and App 5. The user 502 owns two projects, that is, projects for App 6 and App 7. The user 502 follows a user 504 and a project for App 13. The user 504 owns, contributes to, and/or follows five projects, that is, projects for App 8, App 9, App 10, App 11, and App 12. In comparison to FIG. 2, when a first user follows a second user, projects directly connected to the second user are displayed in the scope of interest tree. Direct relationships can be one of owner, follower, or contributor. In FIG. 5A, the user 502 follows the user 504, projects where the user 504 has a direct relationship are provided, and the specific relationships between the user 504 and the displayed projects for App 8, App 9, App 10, App 11, and App 12 are not shown. Furthermore, any subordinate relationships between the user 504 and any other user is not shown in the scope of interest tree 500 since the user 502 only has a follower relationship (and not an owner relationship) with the user 504. The scope of interest tree 500 can also display a number of contributors to a project. For example, the project for App 1 has 47 contributors.

FIG. 5B illustrates an example scope of interest tree 501 for the user 504 according to some implementations of the present disclosure. Projects that the user 504 directly owned, followed, or contributed to, were shown in the scope of interest tree 500 of FIG. 5A, but projects owned by users under the user 504 were not shown. For example, user 506 was not included in the scope of interest tree 500, but the user 506 owns six projects, that is, projects for App 14, App 15, App 16, App 17, App 18, and App 19. The user 506 was not included since the user 504 and the user 502 merely have a follower relationship instead of an ownership relationship. This can be contrasted with FIG. 2 where an ownership relationship between the user 206 and the user 208 populates the user 212 in the scope of interest tree 200.

From FIGS. 5A and 5B, the user 502 has 19 applications of interest. That is, 19 applications encompass the set of applications that the user 502 is interested in. 13 of the 19 applications are shown in the scope of interest tree 500, and 6 of the 19 can be obtained via the user 506 (who is a subordinate of the user 504). Although the 6 projects for App 14, App 14, App 16, App 17, App 18, and App 19 are not included in the scope of interest tree 500, in some embodiments, the user 502 can still have access to statistics involving these 6 projects.

Figure 5C:
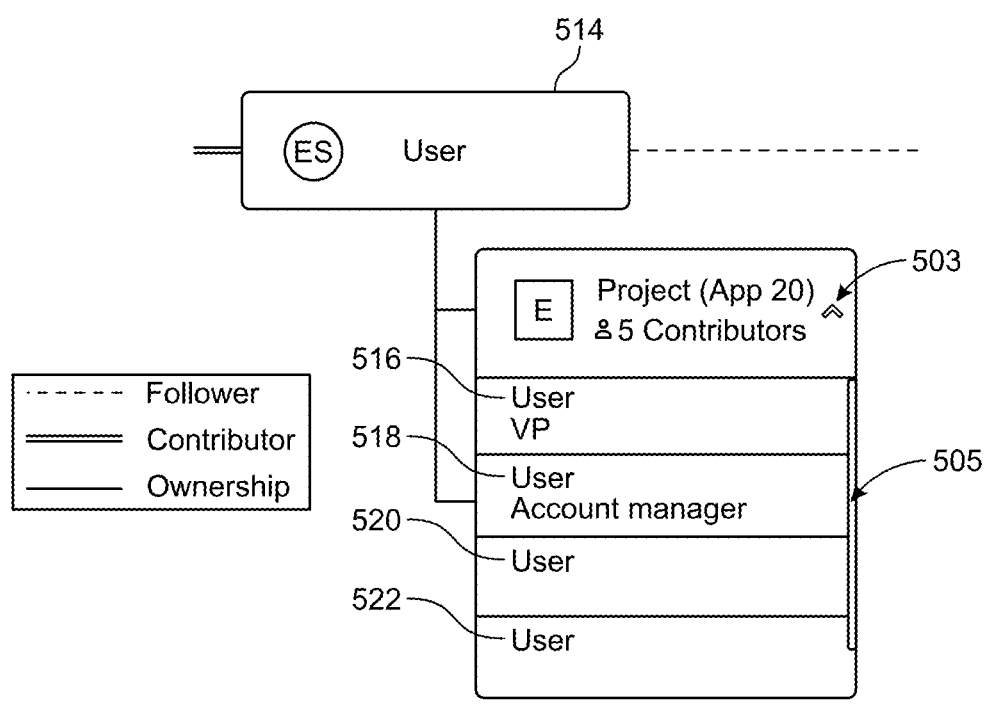
FIG. 5C illustrates a scope of interest tree displaying contributors according to some implementations of the present disclosure.

FIG. 5C illustrates an example of further graphically depicting contributors according to some implementations of the present disclosure. In FIG. 5C, a user 514 owns a project for an application App 20. The project for App 20 has 5 contributors. Clicking on indicator 503 can prompt a display of the different contributors. A scrollbar 505 can be provided to scroll through the different contributors of a project.

Figure 6:
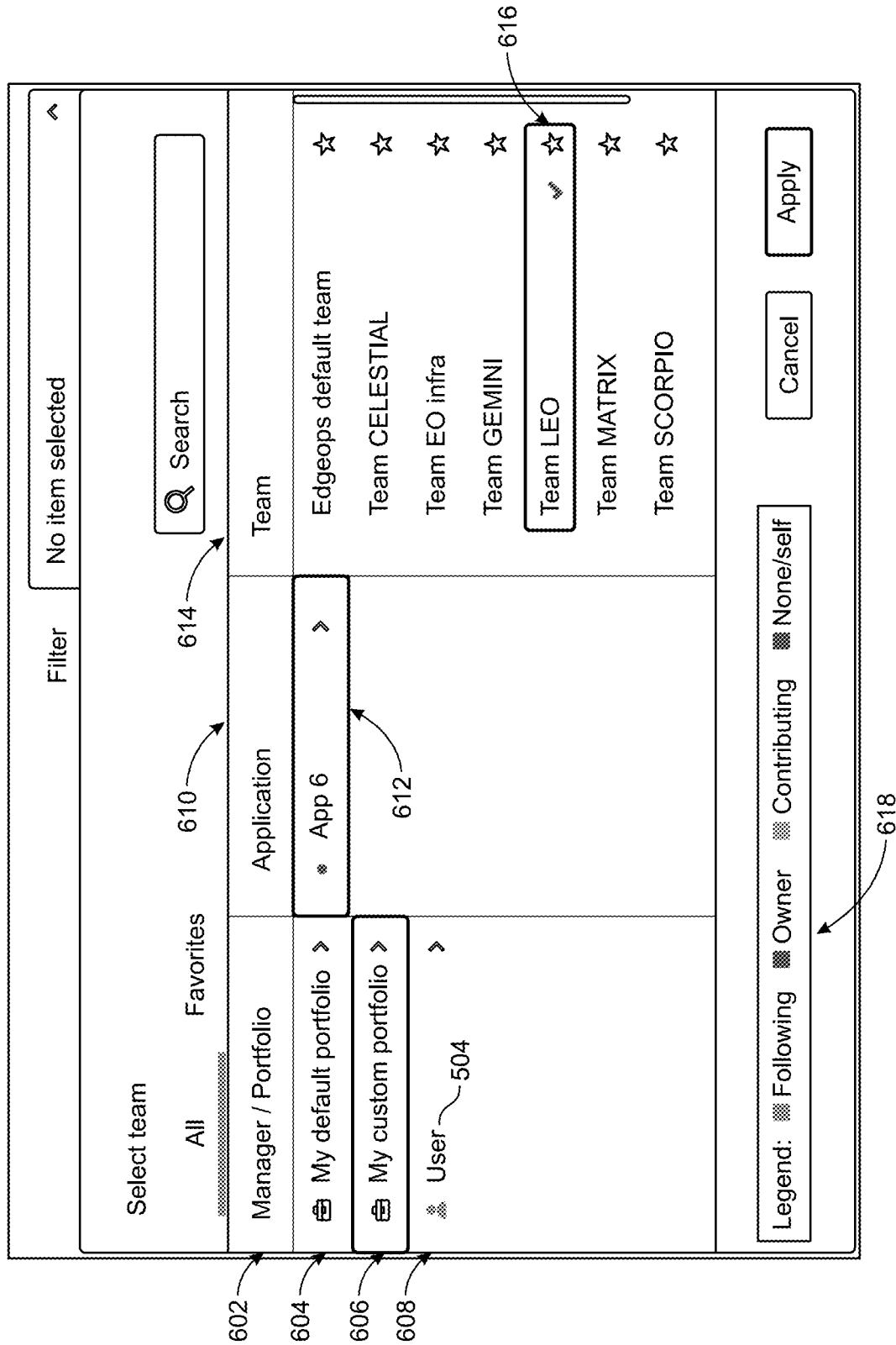
FIG. 6 is an example view depicting portfolio, application, and team view filtering, according to some implementations of the present disclosure.

Returning to FIGS. 5A and 5B, the user 502 has 19 applications of interest, and viewing data from 19 applications can be overwhelming if not filtered properly. FIG. 6 illustrates an example filter view through portfolio view, application view, and/or team view. In a portfolio view, a portfolio column 602 lists the portfolios for the user 502. For example, the portfolio view includes a first portfolio 604 named "My default portfolio," a second portfolio 606 named "My custom portfolio," and a third portfolio 608 named "User 504." A legend 618 is provided to interpret icons and symbols next to the portfolio names. For example, the user 504 is shaded blue which indicates that the user 502 is following the user 504.

When a portfolio is selected, an application column 610 lists applications or projects under that portfolio. For example, in FIG. 6, the second portfolio 606 is selected, and an application 612 named "App 6" is shown under the application column 610. Furthermore, the application 612 when selected can drill down into a team view thus populating a team column 614. Data associated with selected items can be generated for viewing on a client device. For example, "Team LEO" is selected in the team column, therefore, statistics related to Team LEO can be displayed.

Figure 7A:
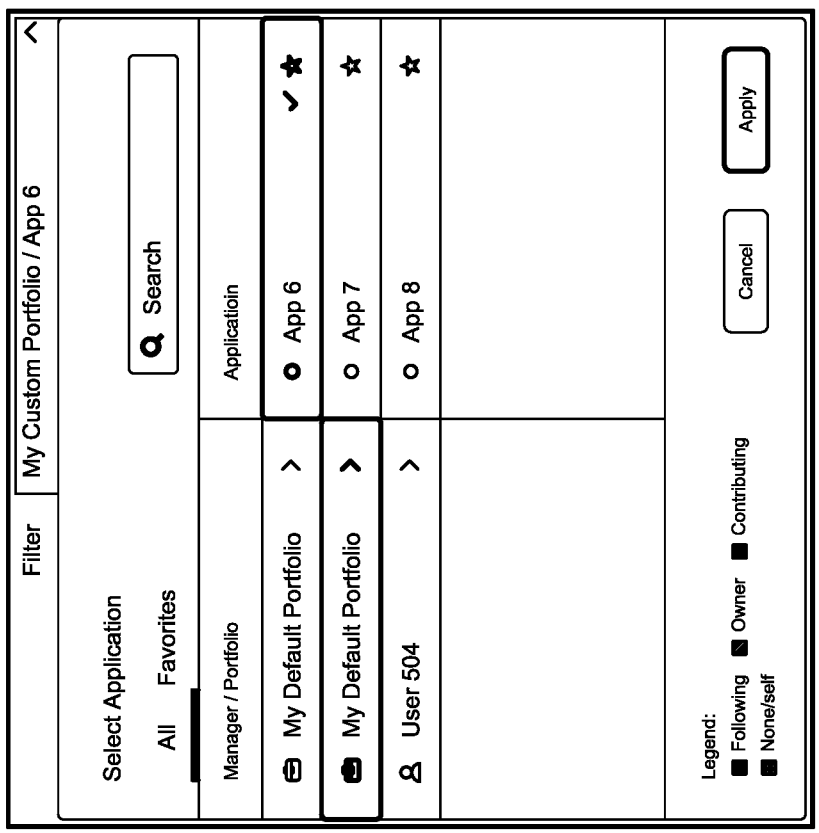
FIG. 7A and FIG. 7B display filter views of a portfolio according to some implementations of the present disclosure.
Figure 7B:
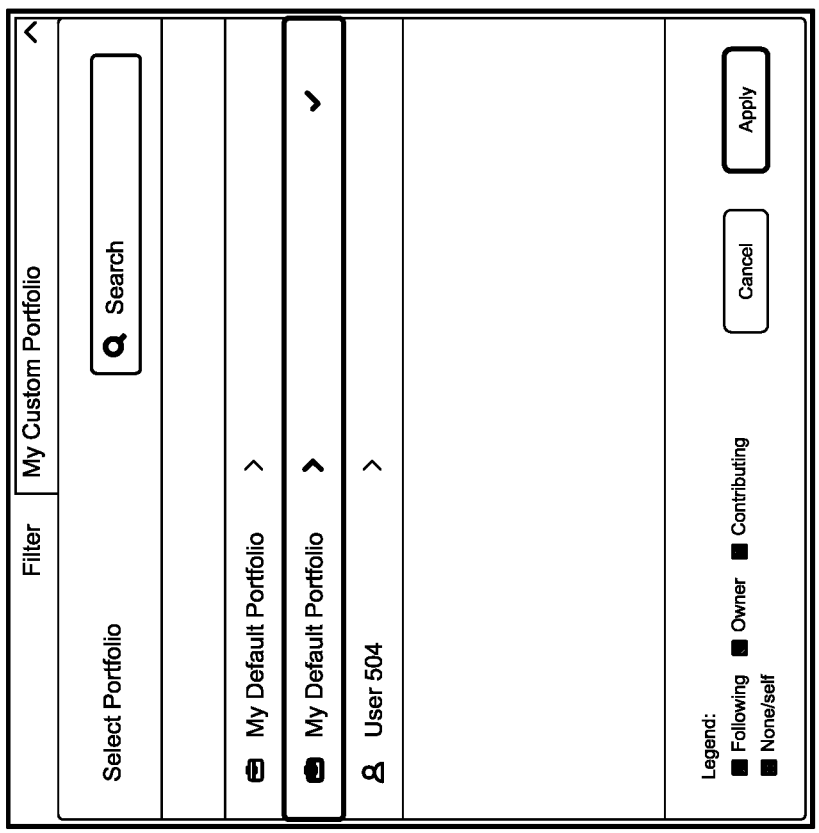

The filter view of FIG. 6 is merely provided as an example of hierarchically tracing through items of interest. The filter view can have different types of views as provided in FIG. 7A and FIG. 7B. In FIG. 7A, App 6 is selected, thus statistics related to App 6 can be displayed. In FIG. 7B, "My custom portfolio" is selected, thus statistics related to all projects under the selected portfolio can be displayed. In FIG. 6, FIG. 7A, and FIG. 7B, the check mark indicates that a specific item is selected.

Different filter views as discussed in connection with FIG. 6 and FIG. 7A and FIG. 7B is an example of multi-level filtering (MLF). In some implementations of the present disclosure, MLF can be implemented as follows. At the portfolio level (see e.g., FIG. 7B), there can be three types of portfolio views: (1) user portfolios, (2) portfolios of direct subordinates, and (3) portfolios of users being followed. For example, given the scope of interest tree 200 of FIG. 2, a user portfolio view for the user 206 is a portfolio that will include a default portfolio (generated automatically based on the scope of interest tree 200) and a custom portfolio (representing an arbitrary group of applications) that the user 206 can create manually.

The default portfolio includes the following applications: (i) applications which the user 206 is a direct owner, (ii) applications which the user 206 is contributing to (e.g., the project 228), (iii) applications which the user 206 follows directly (e.g., the project 224), (iv) applications which a followed user is a direct owner, and (v) applications which the user 206 owns through a hierarchy of subordinates (e.g., the project 218). For applications which the user 206 owns through a hierarchy of subordinates, all relationships within the hierarchy can be resolved all the way down to application owner level. That is, there can be more than one level of subordination as depicted in FIG. 2 where the project 218 will be included in the default portfolio for the user 206 even though the ownership is direct through two users (the user 208 and the user 212).

A portfolio view of direct subordinates has only subordinates of first level for a current user and includes the following applications: (i) applications which the subordinate is a direct owner, (ii) applications which the subordinate owns through the hierarchy of her subordinates, and (iii) applications which the subordinate is a contributor. In some implementations, a general recommendation of not creating ownership relationship deeper than Project/application owner is adopted, thus ownership is recommended for use in managerial level roles/users.

A portfolio view of users being followed includes the following applications: (i) applications that a followed user is a direct owner of, (ii) applications that a followed user owns through the followed user's hierarchy of subordinates, and (iii) applications that the followed user is contributing to.

In some implementations, if a portfolio has no applications, then the portfolio is not added to the list in the MLF.

With the portfolio level discussed, now turning to the application level (see e.g., FIG. 7A). At application level, the MLF shows "manager/portfolio" column and "application" column. If a certain manager/portfolio has no applications, then the manager/portfolio is not shown in the list under the "manager/portfolio" column.

Similar to the application level, team level MLF can be shown. In team level MLF, instead of "manager/portfolio" column, a "team" column is provided alongside the "application" column. If a certain team has no applications, then the team is not shown in the list under the "team" column. Applications that do not have a team are automatically assigned one. That is, a team is automatically created for an application if the application does not have a team.

Figure 8:
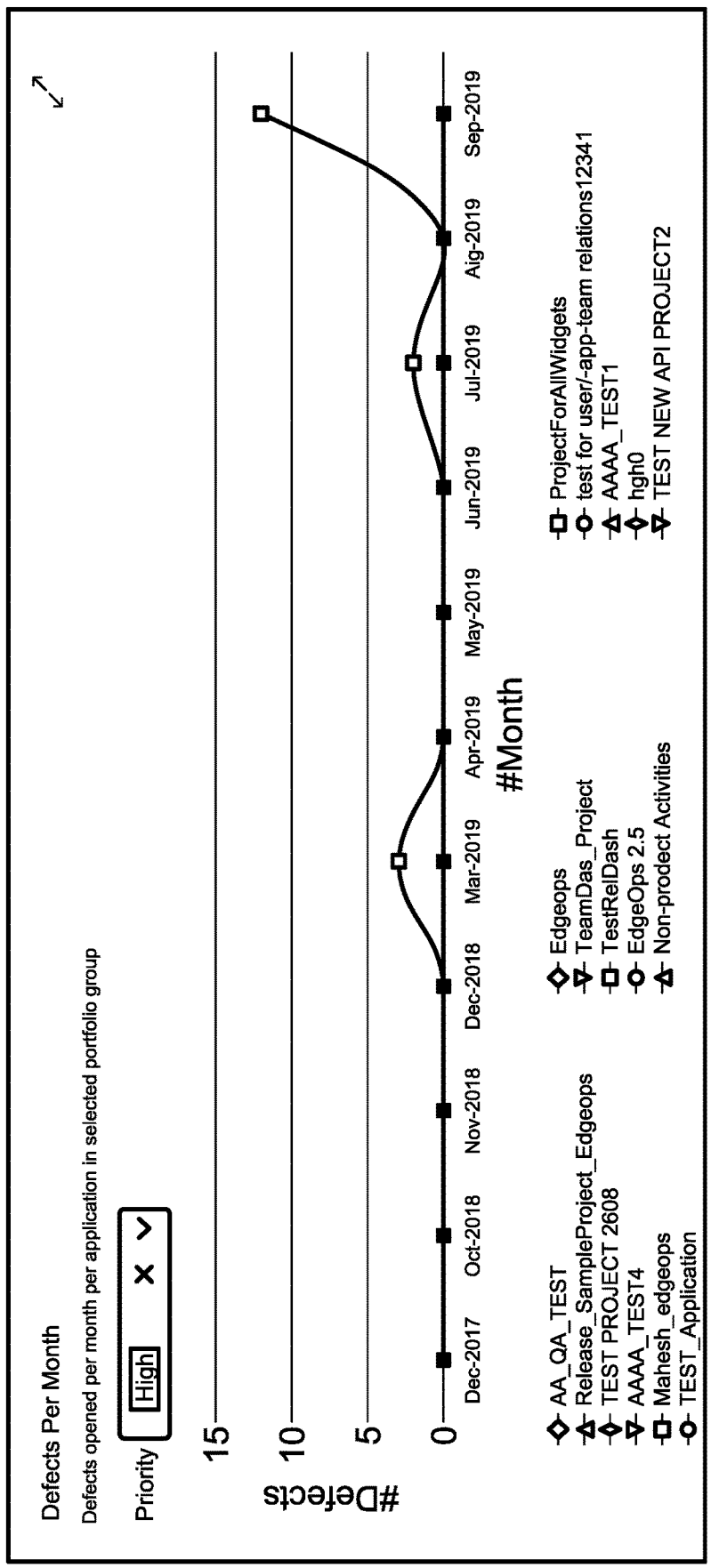
FIGS. 8 and 9 provide example statistics for projects according to some implementations of the present disclosure.
Figure 9:
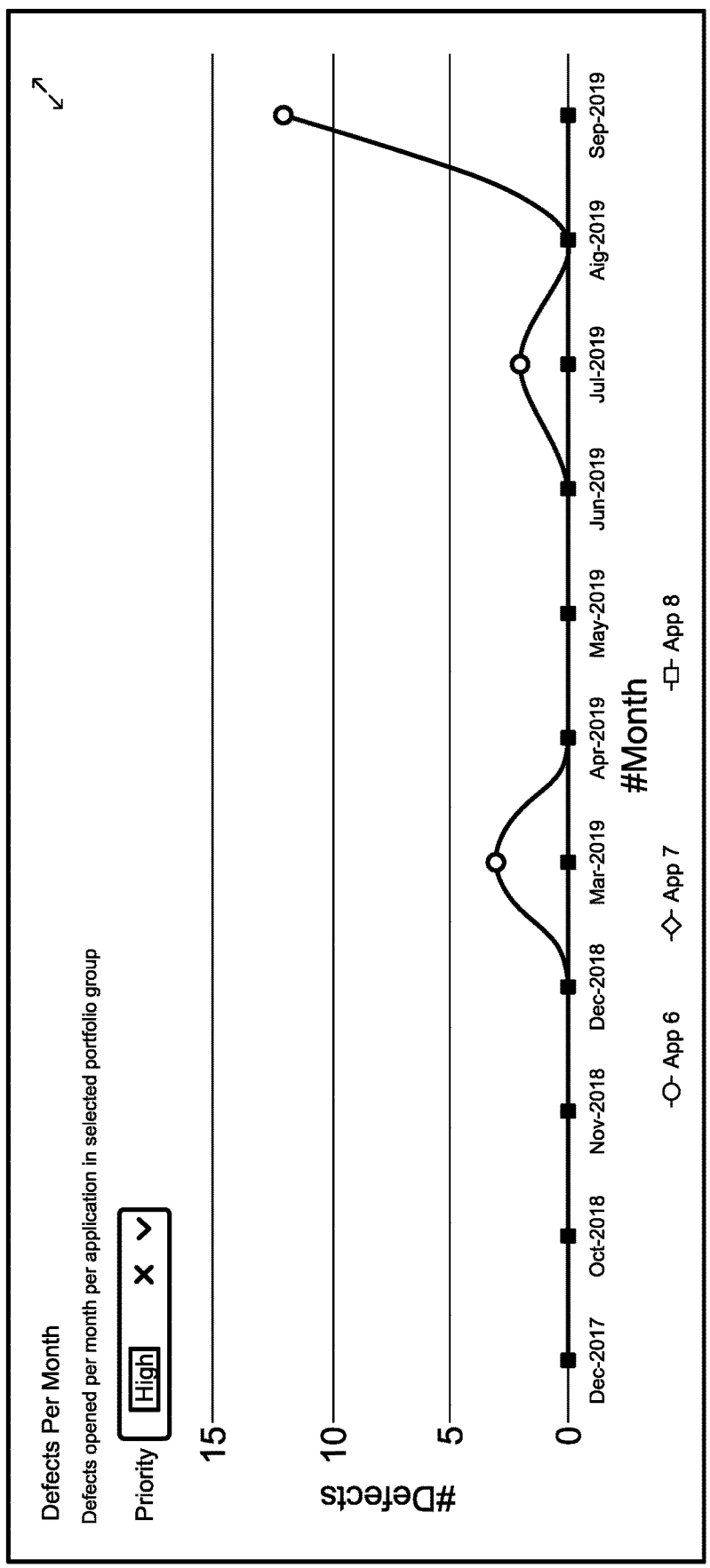

FIG. 8 and FIG. 9 provide example statistics for projects according to some implementations of the present disclosure. Using the different filter views as depicted in FIG. 6 and FIG. 7A and FIG. 7B, different graphs can be provided. In FIG. 8, defect statistics for 16 projects are displayed, and in FIG. 9, defect statistics for 3 projects are displayed. The number of statistics displayed can be expanded or narrowed based on the filter views already discussed. That way, statistics on certain projects can be removed or added by merely traversing the portfolio, application, and team view hierarchies. If working on a portfolio level, a dashboard with portfolio level widgets is provided (graphs and charts that are showing data applicable to a group of applications (e.g. average daily commit rate per application)). If working on an application level, a dashboard with application level widgets is provided (e.g., how many commits each of the application development teams has produced for last 10 days). If working on a team level, a dashboard with team level widgets is provided (e.g., how many commits each member of the team has produced in last 10 days). On each level the filter view changes appearance by allowing a user to dig into a respective level of data.

Embodiments of the present disclosure provide and display data to a user in order to facilitate providing various analytical insights to the user. Statistical data is gathered from various tools and programs running on a server. The statistical data is then assembled, analyzed and displayed to the user. The statistical data can be displayed in the form of dashboards with graphs and charts. In some embodiments, the data is split to multiple levels of presentation—a portfolio level, an application level, or a team level. A portfolio can be defined as a group of applications, applications are customer applications on-boarded onto the server, and teams are customer teams working on a particular application.

Embodiments of the present disclosure allow users to define and instruct the server on what pieces of information may be most interesting for them and/or what data aggregation parameters and rules should be used in formatting these pieces of information. In some embodiments, users define and instruct the server using scope of interests. A scope of interest is a specification of a user's relationship with other users of the system as well as with the registered data entities within the server. In some embodiments, the user can configure his scope of interest by defining his relationship with other users and applications within the server.

The scope of interest can be represented as a dynamic tree object. The dynamic tree object can be built using three types of relationships: ownership, contribution, and following. The object can represent organization structure of the user's company via "ownership" relationship between users on managerial level. The object can also account for the linkage of a user to an application via contribution relationship. Another linkage relationship that can exist is a following relationship, where a user can follow other users and other applications. The dynamic tree object can then be resolved in runtime in order to define which connections the user has to which objects. Based on the connections, the server can provide relevant data to the user.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for tracking features of one or more applications in a software development environment, the system including a non-transitory computer-readable medium storing computer-executable instructions thereon such that when the instructions are executed, the system is configured to:
monitor the one or more applications, generating records associated with the one or more applications and tracking progress data associated with features of the one or more applications;
determine, from a scope of interest data, a set of applications from the one or more applications, the set of applications being associated with a user;
determine, from the scope of interest data, roles for each application in the set of applications, wherein the roles are described in relation to the user;
extract, from log data, user log data associated with the set of applications based on the roles for each application in the set of applications;
extract, from the progress data, user progress data associated with the set of applications based on the roles for each application in the set of applications; and
provide, to a client device via an application programming interface (API), the user progress data associated with the set of applications and the user log data associated with the set of applications for displaying on the client device.

2. The system of claim 1, wherein the scope of interest data includes a tree structure with a parent node identifying the user and one or more leaf nodes identifying the set of applications.

3. The system of claim 2, wherein the tree structure includes intermediate nodes that identify other users.

4. The system of claim 3, wherein the user progress data are extracted based on the intermediate nodes and wherein the user log data are extracted based on the intermediate nodes.

5. The system of claim 3, wherein one of the intermediate nodes is a pointer to a first scope of interest data associated with a first user, the first scope of interest data stored separately from the scope of interest data.

6. The system of claim 1, wherein the roles are selected from the group consisting of: ownership, contributor, and follower.

7. The system of claim 1, when the instructions are executed, the system is further configured to:
receiving one or more scope instructions from the client device; and
populate the scope of interest data based on the one or more scope instructions.

8. The system of claim 7, wherein the one or more scope instructions include:
an instruction to add a first user to the scope of interest data, the first user being related to the user in an ownership relationship;
an instruction to remove a second user from the scope of interest data;
an instruction to add a first application to the scope of interest data, the first application being an application in the set of applications, and the first application being related to the user in an ownership relationship;
an instruction to add a second application to the scope of interest data, the second application being an application in the set of applications, and the second application being related to the user in a following relationship;
an instruction to add a third application to the scope of interest data, the third application being an application in the set of applications, and the third application being related to the user in a contributing relationship;
an instruction to remove a fourth application from the scope of interest data; or any combination thereof.

9. The system of claim 1, wherein the records are generated according to a publisher/subscriber model.

10. The system of claim 9, further configured to:
subscribe to a Kafka topic, wherein generating the records includes generating records associated with the Kafka topic.

11. A method for tracking features of one or more applications in a software development environment, the method including:
monitoring the one or more applications to generate records associated with the one or more applications and progress data associated with features of the one or more applications;
determining, from a scope of interest data, a set of applications from the one or more applications, the set of applications being associated with a user;
determining, from the scope of interest data, roles for each application in the set of applications, wherein the roles are described in relation to the user;
extracting, from log data, user log data associated with the set of applications based on the roles for each application in the set of applications;
extracting, from the progress data, user progress data associated with the set of applications based on the roles for each application in the set of applications; and
providing, to a client device via an application programming interface (API), the user progress data associated with the set of applications and the user log data associated with the set of applications for displaying on the client device.

* * * * *